(12) United States Patent
Dix et al.

(10) Patent No.: US 7,715,966 B2
(45) Date of Patent: May 11, 2010

(54) METHOD FOR CREATING SPIRAL SWATH PATTERNS FOR CONVEX POLYGON SHAPED FIELD BOUNDARIES

(75) Inventors: Peter J. Dix, Naperville, IL (US); Kousha Moaveni-Nejad, Chicago, IL (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/493,332

(22) Filed: Jun. 29, 2009

(65) Prior Publication Data

US 2009/0265053 A1 Oct. 22, 2009

Related U.S. Application Data

(63) Continuation-in-part of application No. 11/681,445, filed on Mar. 2, 2007.

(51) Int. Cl.
*A01B 69/00* (2006.01)

(52) U.S. Cl. .......................................... 701/50; 701/26

(58) Field of Classification Search ................... 701/50, 701/26

See application file for complete search history.

(56) References Cited

U.S. PATENT DOCUMENTS

| | | | |
|---|---|---|---|
| 3,251,582 A * | 5/1966 | Murphy | ....................... 366/261 |
| 5,406,491 A | 4/1995 | Lima | |
| 5,646,846 A | 7/1997 | Bruce et al. | |
| 5,802,492 A | 9/1998 | DeLorme et al. | |
| 5,995,902 A | 11/1999 | Monson | |
| 6,070,673 A | 6/2000 | Wendte | |
| 6,076,025 A * | 6/2000 | Ueno et al. | .................... 701/23 |
| 6,128,574 A | 10/2000 | Diekhaus | |
| 6,236,924 B1 | 5/2001 | Motz et al. | |
| 6,321,158 B1 | 11/2001 | DeLorme et al. | |
| 6,501,422 B1 * | 12/2002 | Nichols | ................. 342/357.17 |
| 6,505,124 B2 | 1/2003 | Carr et al. | |
| 6,865,465 B2 | 3/2005 | McClure | |
| 6,941,225 B2 | 9/2005 | Upadhyaya et al. | |
| 2004/0193348 A1 * | 9/2004 | Gray et al. | ..................... 701/50 |
| 2005/0197757 A1 * | 9/2005 | Flann et al. | .................... 701/50 |
| 2007/0021913 A1 * | 1/2007 | Heiniger et al. | ............. 701/213 |
| 2007/0083299 A1 | 4/2007 | Lindores | |
| 2007/0213892 A1 * | 9/2007 | Jones et al. | .................... 701/23 |
| 2007/0244610 A1 * | 10/2007 | Ozick et al. | ................... 701/23 |
| 2007/0282527 A1 | 12/2007 | Han et al. | |
| 2009/0118904 A1 * | 5/2009 | Birnie | ........................ 701/41 |

FOREIGN PATENT DOCUMENTS

WO 2005/119386 12/2005

* cited by examiner

*Primary Examiner*—Thomas G. Black
*Assistant Examiner*—Shelley Chen
(74) *Attorney, Agent, or Firm*—Patrick M. Sheldrake; John William Stader; Michael G. Harms

(57) ABSTRACT

A computationally efficient method for generating a spiral swath pattern for a region of a field bounded by a convex polygon, the method automatically generating curved portions for the swath pattern having radii of curvature greater than a minimum turning radius based on the minimum turning radius and a definition of the field boundary.

14 Claims, 6 Drawing Sheets

METHOD FOR CREATING SPIRAL SWATH PATTERNS FOR CONVEX POLYGON SHAPED FIELD BOUNDARIES

This application is a Continuation-In-Part of U.S. patent application Ser. No. 11/681,445 filed Mar. 2, 2007, which application is herein incorporated by reference.

TECHNICAL FIELD

The present invention relates generally to swath pattern generation methods for work vehicles, and more particularly to a computationally efficient method for generating spiral swath patterns for a region of a field bounded by a convex polygon, the method automatically generating curved portions of the swath pattern having radii of curvature greater than or equal to a minimum turning radius based on the minimum turning radius and a definition of the field boundary.

BACKGROUND ART

Off road work vehicles in the agricultural, mining and construction fields, such as tractors, and the like, have traditionally operated with manual steering. Improvements in control system design and related position sensing technology, such as global positioning systems (GPS), including differential correction systems, as well as real time kinematic (RTK) satellite navigation have led to an increase in the use of automatic guidance control systems for these vehicles. The combination of improved navigation input signals precisely identifying vehicle position and speed with sophisticated on board vehicle electronic control systems allows for automatic guidance systems capable of steering the vehicle with a high degree of accuracy when traversing terrain.

To provide this control, the prior art teaches using satellite positioning information by an onboard vehicle navigation control system to accurately determine and control a vehicle's position while operating in a field. A preplanned route, based on information previously known about the terrain of the field, or a control system generated route may be used. The control methods are well known in the art, and may involve multiple position transmitters or receivers, with various signals used to derive vehicle location, elevation, direction of travel or heading, and speed.

The task of precision guidance of an agricultural vehicle involves not only accurately determining vehicle position in a field, but also defining an efficient swath pattern or array of swath lines to be followed by the vehicle that will, in conjunction with the swath width of an element associated with the vehicle, create an overall swath pattern that efficiently and effectively covers the crop area of a field. The pattern must be located and oriented on the field, and the physical characteristics and limitations of the vehicle and coupled implement must be identified and provided to the navigation system. Implement or header width, location of the implement or header with respect to the vehicle, and limitations on the vehicle and associated implement movement, such as minimum turning radius, must also be considered. With this information it is possible to define an array or series of swath lines for the vehicle to travel in an attempt to cover all cultivatable portions of a field without unnecessary skips or overlaps.

Calculating the series of swath lines needed to cover an area without substantial skips or overlaps is relatively straightforward when straight lines can be used; however, not all fields can be covered in this manner. In some fields it may be desirable to use a spiral swath pattern in which the swath lines require a variation in curvature along at least some portion of its length. Such conditions preclude a complete reliance on geometrically predefined swath lines, such as straight lines or constant radius curves. In order to provide generally equally spaced swath lines for a spiral swath pattern, each adjacent swath line must change slightly compared to the prior swath line as the vehicle traverses field.

Vehicle navigation systems typically must be able to store and retrieve swath path information as well as determine new adjacent swath paths from a baseline swath path or create new swath paths from defined starting and ending positions. The number of swath lines to be stored and/or determined increases as the size of the field increases. Presently known systems for generating spiral swath patterns require a significant number of positional data points to fully define the swath lines between starting and ending points compared to using only starting and ending position points to create straight-line paths. The computation time and memory storage required for generating and traversing a spiral swath pattern are often drawbacks to these systems. Thus the size and arrangement of some fields is such that generating and/or storing a spiral swath pattern according to presently known methods is both inconvenient and inefficient because of the computation time and memory requirements, especially if the field is large and the system boundary is known and can be described by a convex polygon.

In addition, presently known systems typically generate swath lines as a function of a baseline swath line. The radius of curvature of every curved portion of each of the generated swath lines must then be computed and compared to the minimum turning radius of the vehicle. If the radius of curvature of the generated swath line is too small, the generated swath line must be regenerated for use by the vehicle. Often this computation and regeneration is made during operation of the vehicle in the field resulting in increased computation and memory requirements.

What is sought is a system and method to generate spiral swath patterns for a convex polygon shaped field which overcomes at least one of the problems, shortcomings, or disadvantages set forth above.

SUMMARY OF THE INVENTION

What is disclosed is a method to generate spiral swath patterns for a convex polygon shaped field which overcomes at least one of the problems, shortcomings, or disadvantages set forth above.

According to a preferred embodiment of the present invention a method for generating a spiral swath pattern to be driven by a work vehicle over a convex polygon shaped region of a field is disclosed. The method includes determining a minimum turning radius, such that the minimum turning radius defines the minimum radius of curvature of the swath pattern and defining a swath width as a function of a lateral extent of the work vehicle or an implement of the work vehicle. The boundary of the region is defined including first through nth line segments having headings in a direction of rotation and intersecting at first through nth corners defined by first through nth angles. First through nth bases are defined wherein the second through nth bases are located at the second through nth corners, respectively, and the first base is defined at a transition corner defined by a transition angle. The transition corner is defined at the intersection of the nth line segment and a transition line parallel to the first line segment and spaced toward the interior of the region by one swath width. First through nth bisectors having headings toward the interior of the region at the first through nth bases, respectively, are defined such that the first through nth bisectors bisect the transition angle and the second through nth angles, respectively. The spiral swath pattern is generated as a series of concentric swath lines to be driven by the work vehicle in the direction of rotation. Each one of the swath lines include first through nth linear portions spaced apart at the swath width and correspond to the first through nth line segments, respectively. First through nth curved portions are defined along a circle having a radius greater than or equal to the minimum turning radius tangent to consecutive linear portions and centered along the first through nth bisectors, respectively. The swath lines are generated as a function of at least some of: a) the boundary of the region; b) the minimum turning radius; c) the first through nth bisectors; and d) the swath width.

Because the swath lines of the spiral swath pattern are generated as a function of the minimum turning radius, each curved portion, by definition, is within the turning capability of the vehicle. Unlike prior art systems, computation of the radius of curvature of each curve and comparison of that radius to the minimum turning radius of the vehicle and possible modification of the swath line is unnecessary.

Subsequent swath lines are generated by defining first through nth linear portions spaced one swath width from first through nth linear portions, respectively, of a previous swath line and defining first through nth curved portions along circles having a radius greater than or equal to the minimum turning radius tangent to consecutive linear portions of the previous swath line and centered along the first through nth bisectors, respectively.

According to an aspect of the present invention, transition points for transitioning between the linear portion and the curved portion for each one of the swath lines are generated as a function of the first through nth bases, the first through nth bisectors and the minimum turning radius.

According to another aspect of the present invention, first through nth skips for each one of the swath lines are identified as a function of the first through nth bases, the first through nth bisectors, the minimum turning radius, and the transition points for each one of the swath lines.

According to another embodiment of the present invention, additional swath lines to be driven by the work vehicle are generated corresponding to the first through nth skips for each one of the swath lines.

According to a feature of the present invention, the swath pattern is generated by a control system of the work vehicle.

According to another feature of the present invention, the swath pattern is generated remotely and communicated to the control system of the work vehicle.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE INVENTION

The swath generation methodologies described herein may find application in precision agriculture systems used to control crop spraying operations, harvesting operations, cultivation and plowing operations, planting and seeding operations, fertilizer application, or other operations where highly accurate positioning information is used in conjunction with defined patterns of swaths to control transit of a vehicle over a land area. Such systems for precision location determination are generally well known and are exemplified by those disclosed in U.S. Pat. Nos. 6,199,000 and 6,553,299, each entitled "Methods and Apparatus for Precision Agriculture Operations Using Real Time Kinematic Global Positioning Systems" which are incorporated herein in their entirety by reference. Although the various methods will be described with particular reference to GPS satellite-based systems, it should be appreciated that the teachings are equally applicable to guidance systems using other methods to determine vehicle position.

Figure 1:
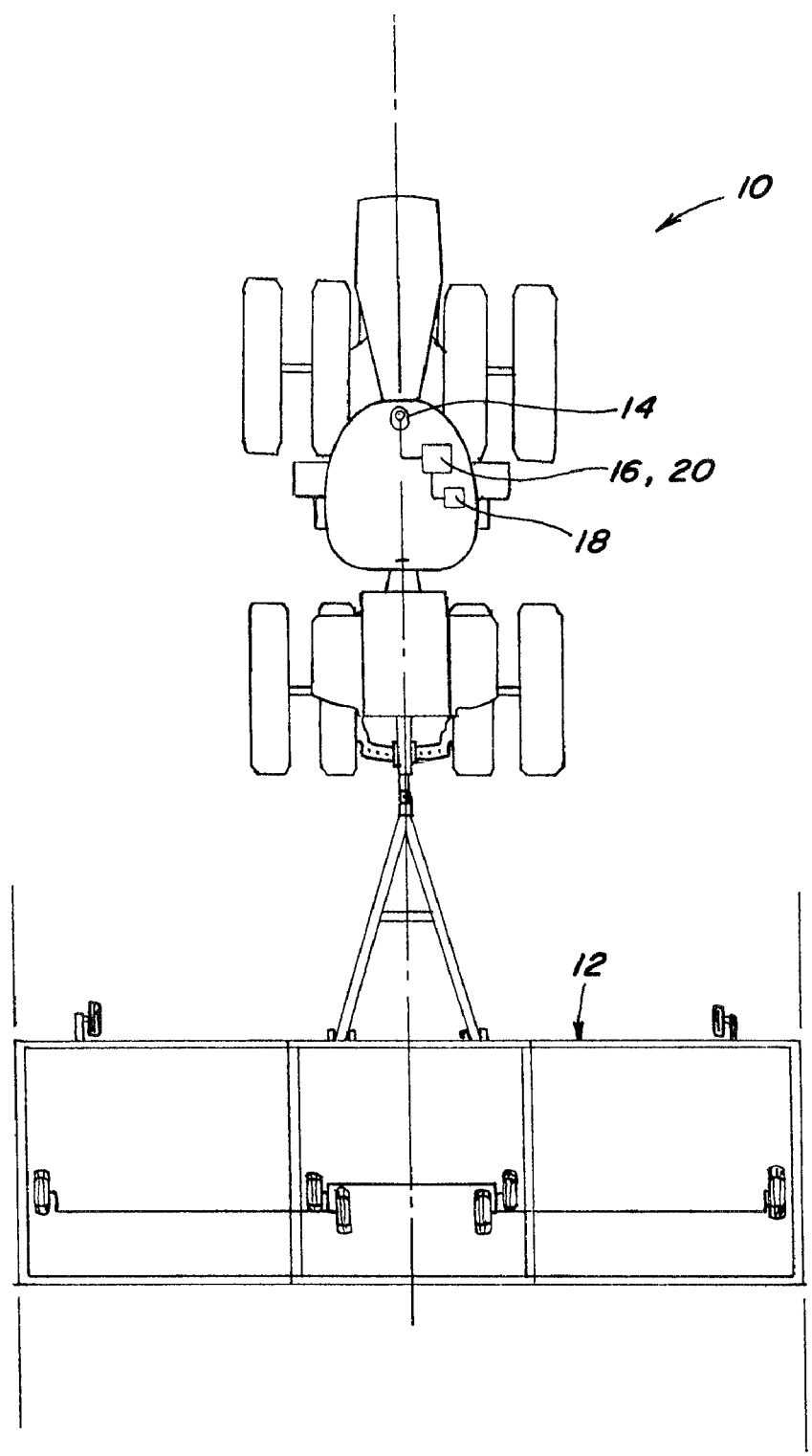
FIG. 1 is a top view of a representative work vehicle having an implement coupled thereto.
Figure 2:
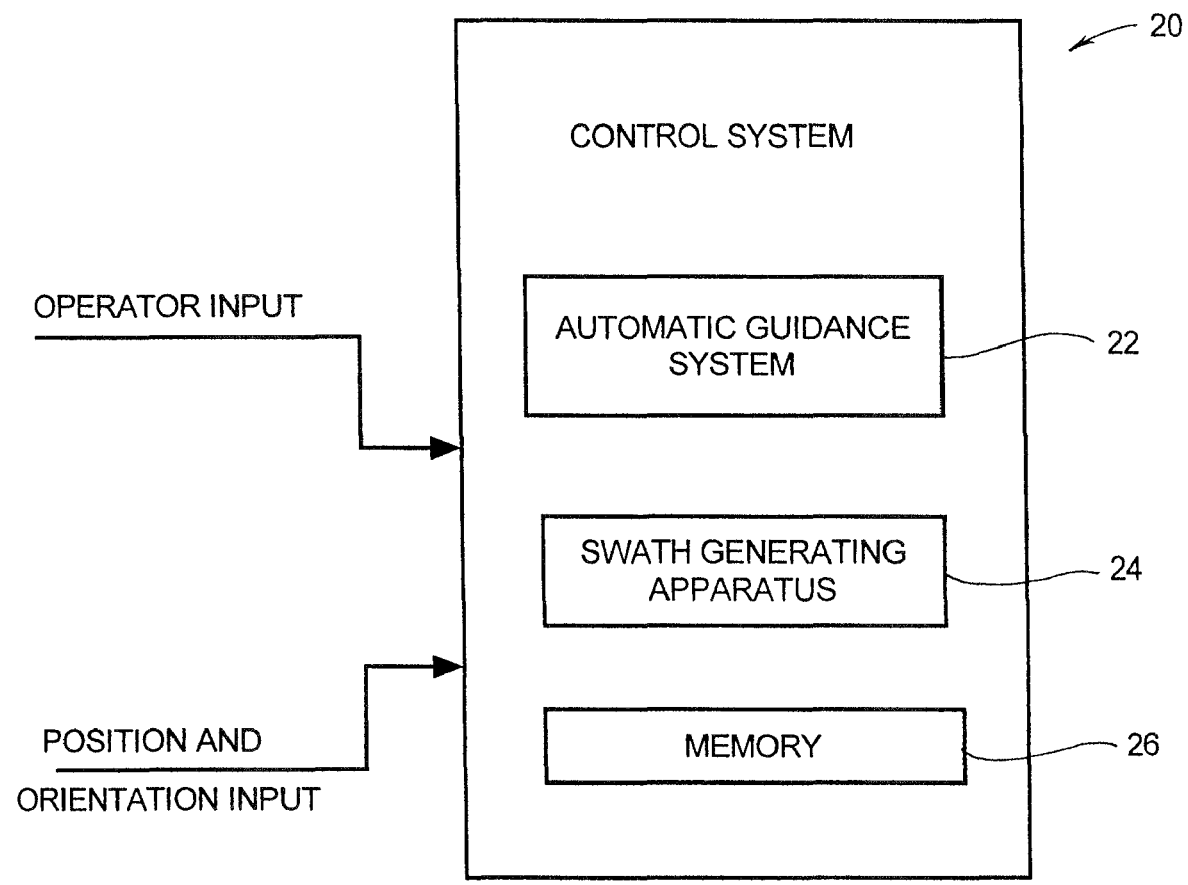
FIG. 2 is a top level representation of an automatic guidance system including a swath generating apparatus according to the present invention.

A work vehicle, represented in FIG. 1 by a tractor 10, and an implement 12 coupled thereto is of the type commonly used in agricultural and construction operations. Work vehicles are commonly equipped with a global positioning system (GPS), represented by vehicle position receiver 14, that determines position information used by a control system 20 of an onboard computer 16 to simplify the task of driving tractor 10. An operator may use an operator interface 18 to provide input to control system 20. Included as part of control system 20 is an automatic guidance system 22, a swath generating apparatus 24, and a memory device 26 as shown in FIG. 2. Typically swath generating apparatus 24 generates generally parallel swath lines that, in the aggregate, define a swath pattern that covers the crop growing area of the field. Automatic guidance system 22 continually calculates a vehicle steering heading by comparing vehicle position and directional heading to a desired swath line provided by swath generating apparatus 24, and sends the vehicle steering heading to a steering unit, which in turn actuates vehicle steering (i.e., steered wheels), thereby changing the vehicle heading in a well known manner. Tractor 10 may further include other sensors which would also be communicatively coupled to control system 20. Though shown as discreet devices within control system 20, the functions of automatic guidance control system 22, swath generating apparatus 24, memory 26, and other portions of control system 20 can easily be integrated into a single apparatus within the intent of this invention.

Figure 3:
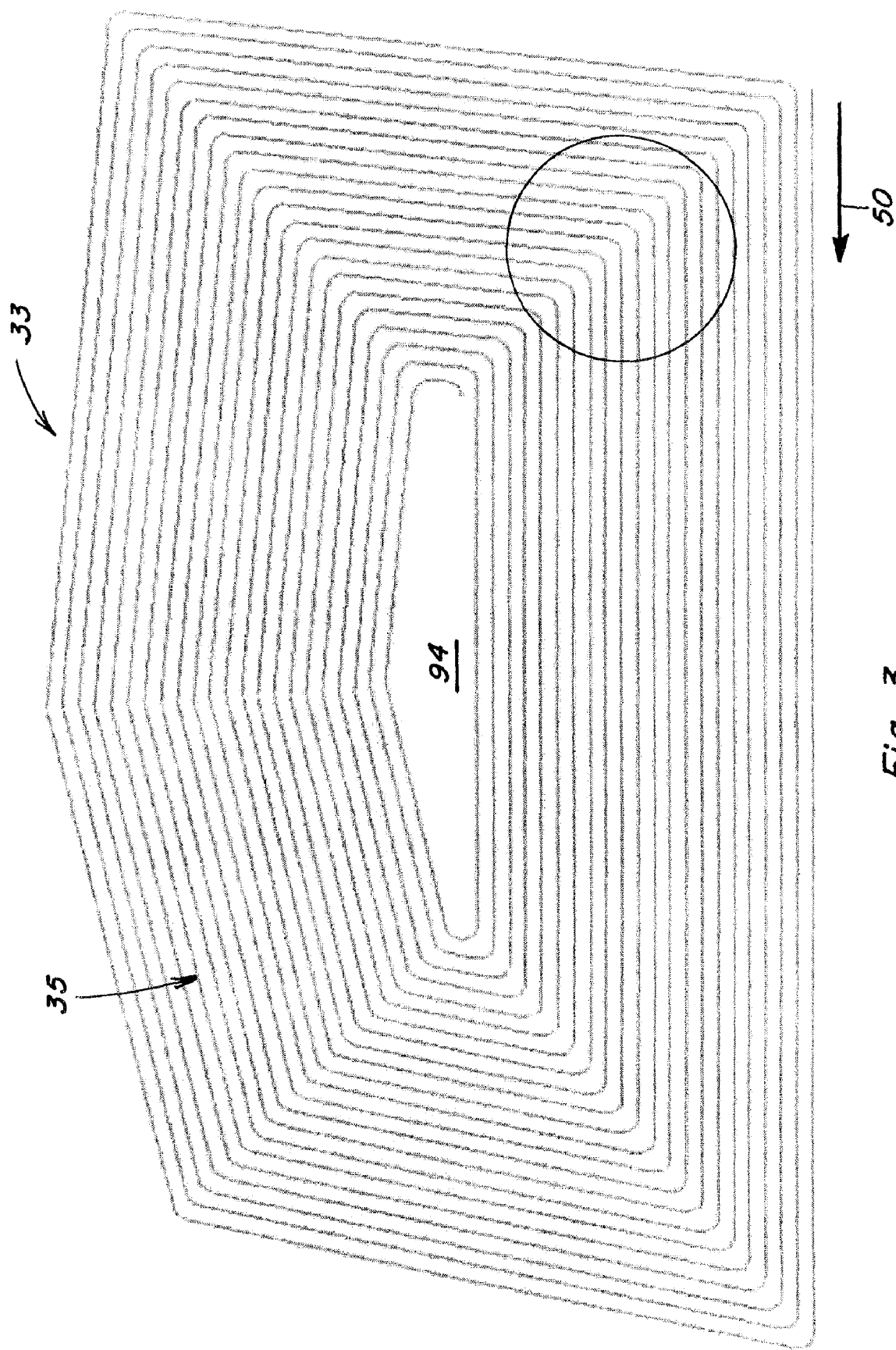
FIG. 3 is a top view of a region of a field bounded by a convex polygon including a swath pattern generated according to the present invention.
Figure 3A:
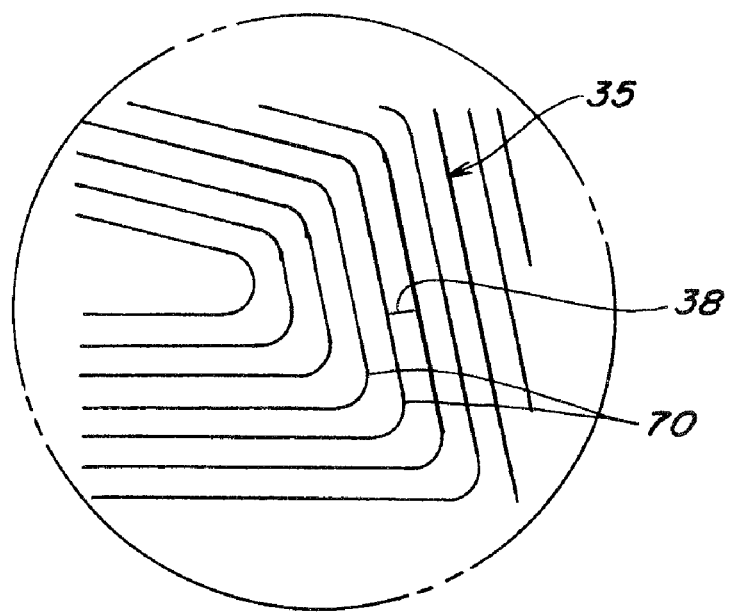
FIG. 3a is an enlarged view of a portion of the swath pattern of the region of FIG. 3.
Figure 4:
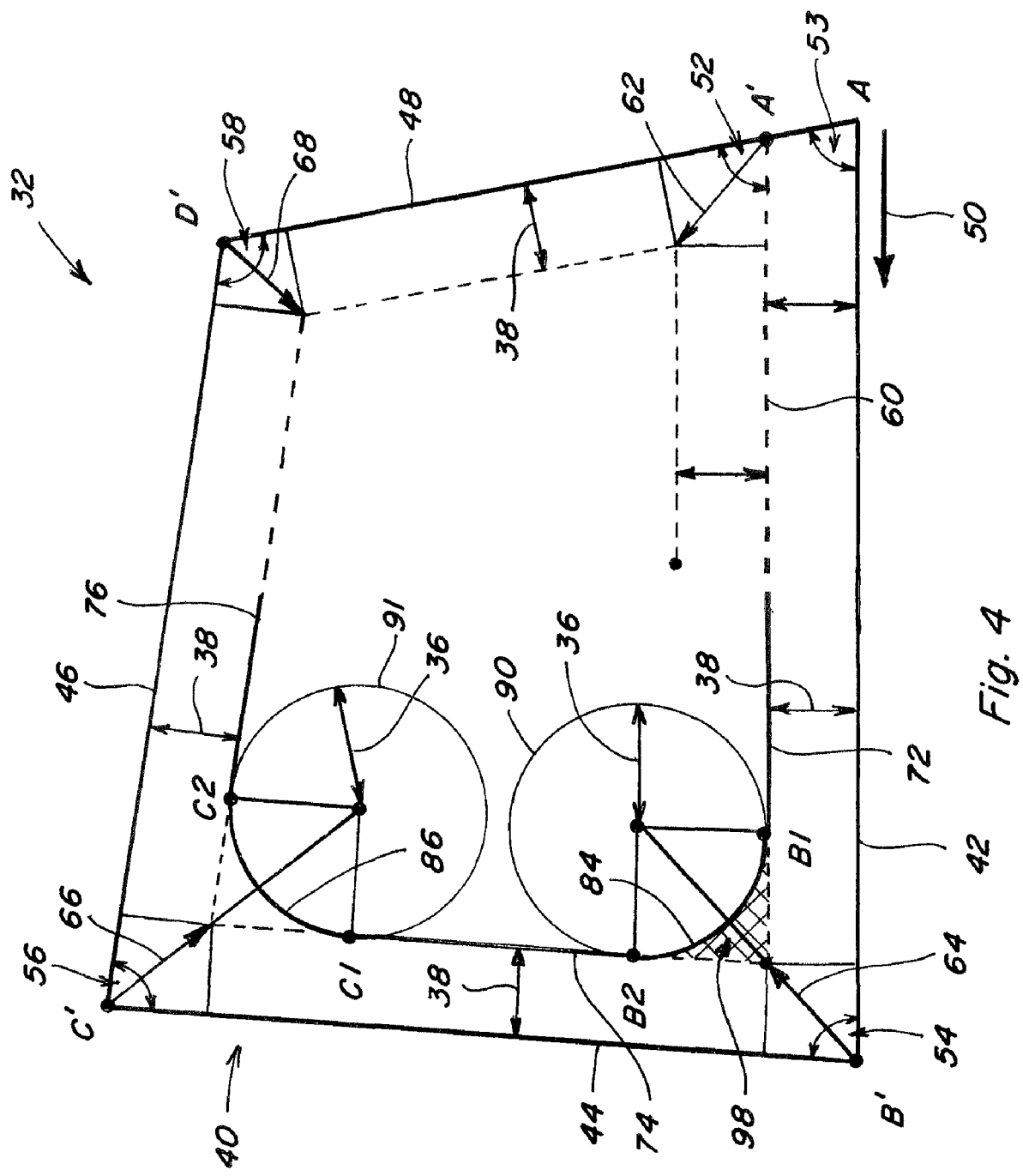
FIG. 4 is a top view of a region of a field bounded by a convex polygon including a swath line according to the present invention.
Figure 5:
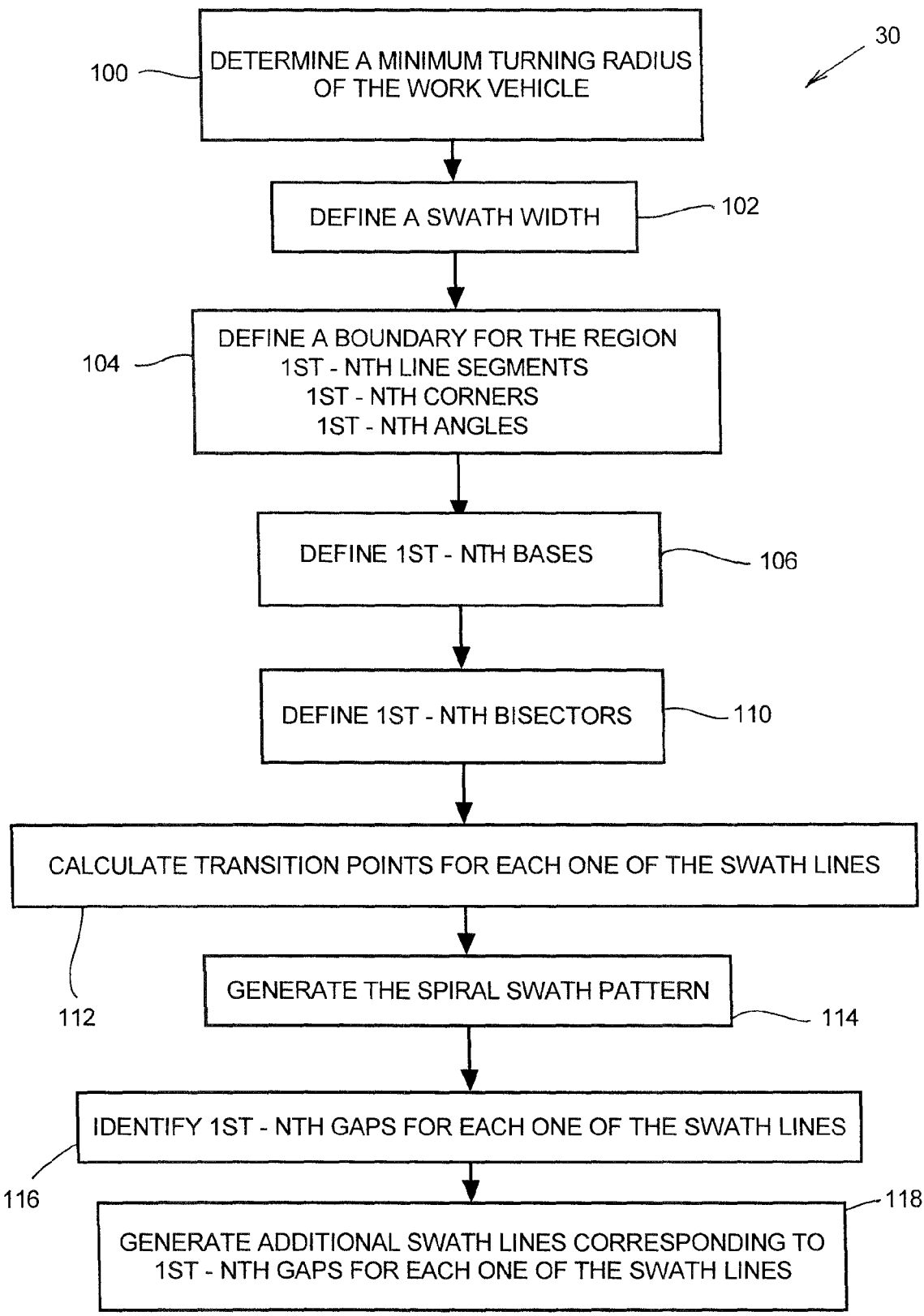
FIG. 5 is a top level flow diagram of a method for generating a spiral swath pattern according to the present invention.

With reference to FIGS. 4 and 5, according to the invention, a method 30 for generating a spiral swath pattern 34 to be driven by a work vehicle, such as tractor 10, over a convex polygon shaped region of a field 32 is disclosed. As seen at step 100 of FIG. 5, method 30 includes determining a minimum turning radius 36 (see FIG. 4), such that the minimum turning radius defines the minimum radius of curvature of swath pattern 34. At step 102 swath width 38 (see FIGS. 3 and 4) is defined as a function of a lateral extent of tractor 10 or implement 12.

Although method 30 is applicable to regions bounded by convex polygons having n sides, a representative swath pattern 35 generated by method 30 for a region 33 having five sides (n=5) is shown in FIG. 3. With reference to FIG. 4, method 30 is described for region 32 bounded by a convex polygon having four sides.

According to step 104 a boundary 40 for region 32 is defined including first through fourth (n=4) line segments 42, 44, 46, 48 having headings in a direction of rotation depicted by arrow 50 and intersecting at first through fourth corners A, B, C, D defined by first through fourth angles 53, 54, 56, 58. According to step 106 of FIG. 5, first through fourth bases A', B', C', D' having first through fourth base angles 52, 54, 56, 58 are defined. Base A' is a transition base located at a transition corner which defines a transition base angle 52 at the intersection of fourth line segment 48 and a transition line 60 parallel to first line segment 42 and spaced toward the interior of region 32 by one swath width 38.

According to step 110 of FIG. 5, first through fourth bisectors 62, 64, 66, 68 having headings toward the interior of region 32 are defined at bases A', B', C', D', respectively. Bisectors 62, 64, 66, 68 bisect angles 52, 54, 56, 58, respectively.

At step 114 spiral swath pattern 34 is generated as a series of concentric swath lines 70 to be driven by tractor 10 in direction of rotation 50. As can be seen in the example shown in FIG. 3 for n=5, each one of the swath lines includes first through fifth linear portions spaced apart at swath width 38 and corresponding to a line segment bordering the region. First through fifth curved portions correspond to bases at second through fifth corners of the region and the transition base near the first corner. The swath lines of the spiral swath pattern are generated as a function of at least some of the following: the boundary of the region, the minimum turning radius, the bisectors, and swath width.

Turning now to the example of FIG. 4, for partial representative swath line 70', linear portions 72, 74, 76 correspond to line segments 42, 44, 46, respectively. Curved portion 84 is defined along a circle 90 tangent to consecutive linear portions 72, 74 at transition points B1 and B2. Circle 90 is centered along bisector 64. Similarly, curved portion 86 is defined along a circle 91 tangent to linear portions 74, 76 at transition points C1 and C2. Circle 91 is centered along bisector 66. Circles 90, 91 have radii greater than or equal to minimum turning radius 36, making curved portions 84, 86, by definition, include radii of curvature greater than or equal to the minimum turning radius. No curved portions will be generated that the vehicle is unable to perform. To achieve this feature, when transition points B2 and C1 overlap, method 30 will no longer generate spiral swath lines because the radius of curvature of a curved portion generated under this condition would have a radius of curvature less than minimum turning radius 36. For example, if transition points B2 and C1 occurred in reverse order relative to direction of rotation 50, method 30 would not generate curved portion 86 because the radius of curvature would be less than the minimum turning radius. This situation is depicted at area 94 of swath pattern 35 of FIG. 3 wherein no swath lines are generated. Unlike prior art methods, computation of the radius of curvature of each curve for comparison to the minimum turning radius of the vehicle and possible modification of the swath line is unnecessary.

Subsequent swath lines are generated by defining first through fourth linear portions spaced one swath width from first through fourth linear portions, respectively, of a previous swath line and defining first through fourth curved portions along circles having a radius greater than or equal to the minimum turning radius tangent to consecutive linear portions of the previous swath line and centered along the first through fourth bisectors 62, 64, 66, 68, respectively.

According to an aspect of the present invention seen at step 112 of FIG. 5, transition points, such as B1, B2, C1, and C2, for transitioning between the linear portion and the curved portion for each one of the swath lines are calculated as a function of first through fourth bases A', B', C', D', the first through fourth bisectors 62, 64, 66, 68, and the minimum turning radius 36. As illustrated in FIG. 4, point B1 identifies the transition point between linear portion 72 and curved portion 84, and point B2 identifies the transition point between curved portion 84 and linear portion 74. Similarly, C1 identifies the transition point between linear portion 74 and curved portion 86, and point C2 identifies the transition point between curved portion 86 and linear portion 76. The location of point B1, for example, can be found as a function of bisector 64, minimum turning radius 36 and a base B'.

According to another aspect of the present invention seen at step 116 of FIG. 5, first through fourth skips for each one of the swath lines are identified as a function of as a function of first through fourth bases A', B', C', D', the first through fourth bisectors 62, 64, 66, 68, the transition points, and the minimum turning radius 36. For example, skip 98 shown cross hatched in FIG. 4 can be identified as a function of base B', bisector 64, minimum turning radius 36, and transition points B1 and B2.

Figure 3B:
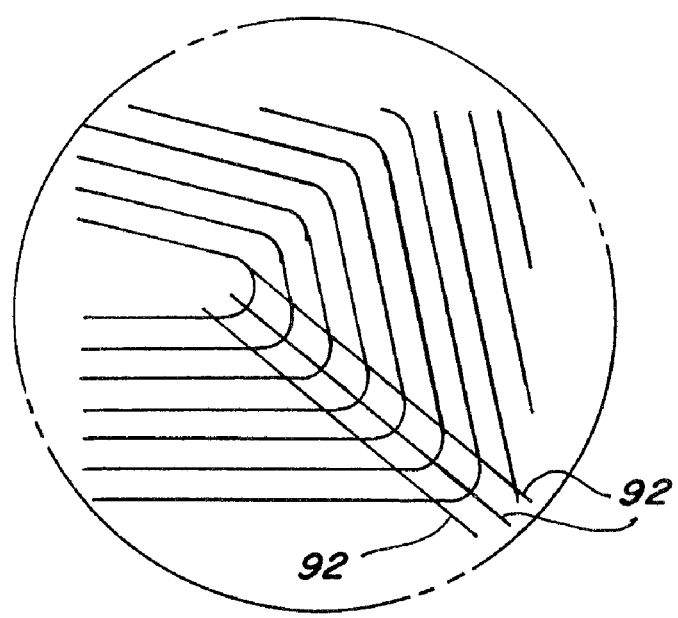
FIG. 3b is the enlarged portion of the swath pattern of the region of FIG. 3 including representative swath lines generated for the skips.

According to another embodiment of the present invention, seen at step 118 of FIG. 5, additional swath lines to be driven by tractor 10 are generated corresponding to the first through fourth skips for each one of the swath lines. Example additional swath lines 92 are shown in FIG. 3b.

According to a feature of the present invention, the spiral swath pattern is generated by control system 20 of tractor 10.

According to another feature of the present invention, spiral swath pattern 34 is generated remotely and communicated to control system 20 of tractor 10.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A method for generating a spiral swath pattern to be driven by a work vehicle over a convex polygon shaped region of a field, the method comprising the steps of:

determining a minimum turning radius, such that the minimum turning radius defines the minimum radius of curvature of the swath pattern;

defining a swath width as a function of a lateral extent of the work vehicle or an implement of the work vehicle;

defining a boundary for the region including first through nth line segments having headings in a direction of rotation and intersecting at first through nth corners defined by first through nth angles;

defining first through nth bases, wherein the second through nth bases are located at the second through nth corners, respectively, and the first base is located at a transition corner defined by an intersection of the nth line segment and a transition line parallel to the first line segment and spaced toward the interior of the region by one swath width;

defining first through nth bisectors having headings toward the interior of the region at the first through nth bases, respectively, such that the first through nth bisectors bisect the transition angle and the second through nth angles, respectively;

generating the spiral swath pattern as a series of concentric swath lines to be driven by the work vehicle in the direction of rotation, each one of the swath lines including first through nth linear portions spaced apart at the swath width and corresponding to the first through nth line segments, respectively, and first through nth curved portions defined along a circle having a radius greater than or equal to the minimum turning radius tangent to consecutive linear portions and centered along the first through nth bisectors, respectively, the swath lines generated as a function of at least some of: a) the boundary of the region; b) the minimum turning radius; c) the first through nth bisectors; and d) the swath width.

2. The method of claim 1, wherein subsequent swath lines are generated by defining first through nth linear portions spaced one swath width from first through nth linear portions, respectively, of a previous swath line and defining first through nth curved portions along circles having a radius greater than or equal to the minimum turning radius tangent to consecutive linear portions of the previous swath line and centered along the first through nth bisectors, respectively.

3. The method of claim 2, further comprising the steps of calculating transition points for transitioning between the linear portion and the curved portion for each one of the swath lines as a function of the first through nth bases, the first through nth bisectors and the minimum turning radius.

4. The method of claim 3, wherein first through nth skips for each one of the swath lines are identified as a function of the first through nth bases, the first through nth bisectors, the minimum turning radius, and the transition points for each one of the swath lines.

5. The method of claim 4, further comprising the step of generating additional swath lines to be driven by the work vehicle corresponding to the first through nth skips for each one of the swath lines.

6. The method of claim 1, wherein the swath pattern is generated by a control system of the work vehicle.

7. The method of claim 1, wherein the swath pattern is generated remotely and communicated to a control system of the work vehicle.

8. A method for generating a spiral swath pattern including concentric swath lines to be driven by a work vehicle over a convex polygon shaped region of a field, the method comprising the steps of:

determining a minimum turning radius, such that the minimum turning radius defines the minimum radius of curvature of the swath pattern;

defining a swath width as a function of a lateral extent of the work vehicle or an implement of the work vehicle;

defining a direction of rotation of the spiral swath pattern;

defining a boundary for the region including first through nth line segments having headings in the direction of rotation and intersecting at first through nth corners defined by first through nth angles;

defining first through nth bases having first through nth base angles as a function of the first through nth line segments, the first through nth angles, and the swath width;

defining first through nth bisectors at the first through nth bases, respectively, such that the first through nth bisectors bisect the first through nth base angles, respectively;

generating the spiral swath pattern as a series of swath lines to be driven by the work vehicle in the direction of rotation, each one of the swath lines including first through nth linear portions corresponding to the first through nth line segments, respectively, and first through nth curved portions corresponding to the first through nth bases, respectively, the first through nth curved portions defined along a circle centered along each one of the first through nth bisectors and tangent to consecutive linear portions, the circle having a radius greater than or equal to the minimum turning radius, the swath lines generated as a function of at least some of: a) the boundary of the region; b) the minimum turning radius; c) the first through nth bisectors; and d) the swath width.

9. The method of claim 8, wherein at least one base is defined at the intersection of one of the line segments and a transition line parallel to a consecutive line segment and spaced toward the interior of the region by one swath width and generating the spiral swath pattern includes generating subsequent swath lines by defining subsequent first through nth bases, defining first through nth linear portions spaced one swath width from first through nth linear portions, respectively, of a previous swath line and defining first through nth curved portions along circles having a radius greater than or equal to the minimum turning radius tangent to consecutive linear portions of the previous swath line and centered along the first through nth bisectors, respectively as a function of the first through nth bases of the previous swath line, the first through nth bisectors, the swath width, and the first through nth base angles.

10. The method of claim 9, further comprising the steps of:
calculating transition points for transitioning between the linear portion and the curved portion for each one of the swath lines as a function of the first through nth bases, the first through nth bisectors and the minimum turning radius.

11. The method of claim 10, wherein first through nth skips for each one of the swath lines are identified as a function of the first through nth bases, the first through nth bisectors, the minimum turning radius, and the transition points for each one of the swath lines.

12. The method of claim 11, further comprising the step of generating additional swath lines to be driven by the work vehicle corresponding to the first through nth skips for each one of the swath lines.

13. The method of claim 8, wherein the swath pattern is generated by a control system of the work vehicle.

14. The method of claim 8, wherein the swath pattern is generated remotely and communicated to a control system of the work vehicle.

* * * * *